United States Patent
Ichihara

(10) Patent No.: US 7,633,774 B2
(45) Date of Patent: Dec. 15, 2009

(54) POWER SUPPLY APPARATUS FOR SUPPRESSING ATTENUATION OF A TRANSMISSION SIGNAL

(75) Inventor: Fumio Ichihara, Fukuoka (JP)

(73) Assignee: Panasonic Corporation, Osaka (JP)

( * ) Notice: Subject to any disclaimer, the term of this patent is extended or adjusted under 35 U.S.C. 154(b) by 10 days.

(21) Appl. No.: 11/541,797

(22) Filed: Oct. 3, 2006

(65) Prior Publication Data
US 2007/0087722 A1 Apr. 19, 2007

(30) Foreign Application Priority Data
Oct. 5, 2005 (JP) .................. P. 2005-292522

(51) Int. Cl.
*H02J 1/02* (2006.01)
*H02M 1/12* (2006.01)
*H02M 1/14* (2006.01)

(52) U.S. Cl. .............. 363/39; 307/2; 455/62; 455/343.1

(58) Field of Classification Search .......... 363/39; 307/1, 2; 370/464
See application file for complete search history.

(56) References Cited

U.S. PATENT DOCUMENTS

| | | | | |
|---|---|---|---|---|
| 4,412,102 A | * | 10/1983 | Ogawa et al. ........... 379/165 |
| 4,897,561 A | * | 1/1990 | Saigo et al. ............ 307/413 |
| 5,408,165 A | * | 4/1995 | Voet ................... 318/523 |
| 5,521,590 A | * | 5/1996 | Hanaoka et al. ........ 340/10.51 |
| 5,726,504 A | * | 3/1998 | Pecukonis et al. ....... 307/105 |
| 5,777,991 A | * | 7/1998 | Adachi et al. .......... 370/352 |
| 6,104,707 A | * | 8/2000 | Abraham .............. 370/295 |
| 6,721,394 B1 | * | 4/2004 | Murphy et al. ......... 379/22.08 |
| 6,898,233 B2 | * | 5/2005 | Philips et al. .......... 375/130 |
| 7,145,784 B2 | * | 12/2006 | Utsuno et al. ........... 363/16 |
| 2002/0171535 A1 | | 11/2002 | Cern |
| 2004/0196923 A1 | * | 10/2004 | Feher ................. 375/299 |
| 2004/0264221 A1 | * | 12/2004 | Mori .................. 363/39 |
| 2005/0097617 A1 | * | 5/2005 | Currivan et al. ........ 725/111 |
| 2006/0077046 A1 | * | 4/2006 | Endo ................. 340/310.11 |

FOREIGN PATENT DOCUMENTS

| | | |
|---|---|---|
| JP | 2000 165304 | 6/2000 |
| JP | 2003 188778 | 7/2003 |
| JP | 2003 283390 | 10/2003 |
| JP | 2004 056766 | 2/2004 |
| WO | 0230003 | 4/2002 |

OTHER PUBLICATIONS

International Search Report dated Nov. 21, 2006.

* cited by examiner

*Primary Examiner*—Edward Tso
*Assistant Examiner*—Arun Williams
(74) *Attorney, Agent, or Firm*—Dickson Wright PLLC

(57) ABSTRACT

A power supply apparatus has a coupled transformer that inputs and outputs a communication signal and a capacitor that has high impedance to a commercial power supply frequency and low impedance to a communication signal frequency. The capacitor is connected between a primary winding of the coupled transformer and a power reception terminal. To both ends of the capacitor, a switching regulator is connected via a noise reduction circuit. To a secondary winding of the coupled transformer, a modem of a power line communication apparatus is connected. In the configuration, the coupled transformer and the switching regulator are thus connected in series.

11 Claims, 15 Drawing Sheets

POWER SUPPLY APPARATUS FOR SUPPRESSING ATTENUATION OF A TRANSMISSION SIGNAL

BACKGROUND

1. Field of the Invention

An embodiment presented below relates to a power supply apparatus and a power line communication apparatus suitable as a power line communication apparatus that performs communication over a power line as a signal transmission line.

2. Description of Related Art

To perform wired data communication at home, office, or factory using a terminal, such as a computer, for example, it is normally required to install wiring for cables and connectors used as transmission lines at required locations. A variety of installation works are thus required before starting operation of communication equipment.

Meanwhile, a commercial power supply of, for example, 120 VAC (60 Hz) in the United States of America or 100 VAC (50/60 Hz) in Japan is mostly used at home, office, factory, and the like. Thus, power lines that supply the power are already installed across home, office, factory, and the like. Using the power lines for data communication would eliminate additional installation of wiring exclusively for communication use. That is, simply plugging a communication apparatus into a power outlet allows securing of a communication path.

As power line communication (PLC) technology for communication using a power line, a technology disclosed in Japanese Patent Laid-open Publication 2000-165304 is known, for example. Various manufacturers have been conducting research and development in certain frequencies (e.g., a high frequency, such as 1.705 to 80 MHz in the United States of America, 2 MHz-30 MHz in Japan, or an ultra high frequency). More specifically, it is envisioned that a multi-carrier signal is generated using a plurality of sub-carriers and transmitted on the power line in an OFDM (Orthogonal Frequency Division Multiplexing) system and the like.

FIG. 20 is a block diagram illustrating a configuration example of a power line communication apparatus. The power line communication apparatus includes coupler 910, modem 920, switching regulator 930, noise reduction circuit 940, and signal reduction circuit 950. Coupler 910 has coupled transformer T1, wherein capacitors C1 and C2 that exclude a component of commercial power supply are connected in series to a pair of transmission lines (power lines) and wherein a primary winding is connected in series with capacitors C1 and C2. A signal is transmitted between the transmission lines and modem 920 via coupled transformer T1. A value is selected for capacitors C1 and C2 so as to have high impedance to commercial power supply and low impedance to a transmission signal (a communication signal).

Modem 920 has transmitter 921, receiver 922, and data processor 923. Noise reduction circuit 940 has capacitors C3 and C4 and common mode coil T2. Signal reduction circuit 950 has normal mode coils L1 and L2.

When there is a part or an apparatus that generates noise, such as switching regulator 930 that supplies power to operate the power line communication apparatus or a switching regulator of a peripheral device connected to the same power lines, noise reduction circuit 940 is provided to the power source unit or the peripheral device so as to prevent the noise from flowing to the power lines. Noise reduction circuit 940 is normally configured to lower impedance between the two power lines in order to eliminate or reduce noise. In power line communication that uses the power lines as the transmission lines, however, noise reduction circuit 940 reduces the impedance between the power lines and thus increases signal loss. In order to prevent attenuation of a signal as being affected by the power source unit that drives the power line communication apparatus or the connected peripheral circuit or peripheral device, signal reduction circuit 950 is provided between noise reduction circuit 940 and the power lines.

Noise reduction circuit 940 provided to the switching regulator and the like generally has capacitors (across capacitors) C3 and C4 and common mode coil:(transformer) T2. Capacitors C3 and C4, which are inserted between two lines, cancel normal mode noise, whereas common mode coil T2 cancels common mode noise. Capacitors C3 and C4 shunt the two lines and reduce a normal mode noise between which the two lines' phase is reverse (hereinafter referred to as "anti-phase normal mode noise"). Inductance of common mode coil T2 reduces a common mode noise between which the two lines' phase is the same (hereinafter referred to as "in-phase normal mode noise").

In power line communication performed on the power lines as the transmission lines, a transmission signal is inserted between the two lines in anti-phase normal mode for communication. Therefore, capacitors C3 and C4, which are inserted between the two lines of noise reduction circuit 940, shunt and attenuate the transmission signal in a frequency band thereof. Capacitors C3 and C4 have substantially low impedance in a frequency band used for power line communication of, for example, 4 MHz to 30 MHz. Noise reduction circuit 940 thereby terminates at low impedance and attenuates a high-frequency signal, which is the transmission signal.

Common mode coil T2 functions as an inductor in in-phase common mode between the two lines. Since the transmission signal output to the transmission lines is in normal mode, however, common mode coil T2 does not function as the inductor for the transmission signal and remains as if not inserted. Further, a frequency for reduction of common mode coil T2 is generally low compared to the transmission signal, and the inductor of common mode coil T2 is designed large. Thus, parallel capacitance is large between the windings (between the transmission lines). Affected by the parallel capacitance that exists as stray capacitance in a frequency band of the transmission signal, common mode coil T2 does not contribute to reduction of the signal. Further, capacitor C4 or switching regulator 930 is taken as a load for the transmission signal, thus leading to attenuation of the transmission signal.

On the contrary, signal reduction circuit 950 is generally formed of normal mode coils L1 and L2 that have a large value, so as to obtain sufficiently higher impedance than the transmission line impedance. The transmission signal is inserted between the two lines in anti-phase (normal mode). Thus, normal mode coils L1 and L2 inserted to the two lines respectively prevent the transmission signal from being leaked to a switching regulator 930 side, being absorbed in noise reduction circuit 940, and being attenuated.

In power line communication that uses the transmission signal in a wideband of, for example, 4 MHz to 30 MHz, the normal mode coils used in the signal reduction circuit are required to maintain high impedance in the wideband. However, it is difficult to make an inductor that constantly has high impedance in a wide signal range. The inductor would be substantially large even when achieved.

In addition, the stray capacitance, including the parallel capacitance component of the inductor between the transmission lines, hampers wideband use. Particularly, a high-power-consumption device, such as the power source unit and the connected peripheral device, has a large inductor, thus causing large stray capacitance and significantly hampering wideband use.

Further, in a case when installed in the high-power-consumption device and in other cases, setting a large value so as to obtain high impedance causes magnetic saturation of a core and the like, and thus it is difficult to obtain the high impedance.

In a configuration where the signal reduction circuit and the noise reduction circuit are connected in parallel to the coupler and the modem of the power line communication apparatus as described above, the normal mode coil that has high impedance in the wideband is required as the signal reduction circuit. It is difficult, however, to achieve such signal reduction circuit, particularly when the high-power-consumption device is connected.

SUMMARY

The embodiment examples have taken the above-described problems, and aims to provide a power source apparatus and a power line communication apparatus capable of eliminating or simplifying a signal reduction circuit and of supplying power without attenuating a transmission signal.

The power supply apparatus outputs predetermined voltage based on alternative voltage on which a communication signal is superimposed. The alternative voltage has first frequency. The communication signal has second frequency higher than the first frequency. The power supply apparatus includes a transformer and a capacitor. The transformer has a primary winding and a secondary winding. The primary winding transmits the communication signal to the secondary winding. The capacitor is connected in series with the primary winding. The capacitor has impedance characteristics such that impedance at the first frequency is higher than impedance at the second frequency. The power supply apparatus outputs the predetermined voltage through the capacitor.

The configuration above allows power supply to a power load and enables input and output of the communication signal via the transformer. The communication signal is prevented from flowing to a side of the power load. Thereby, power can be supplied to the power load without attenuating the communication signal, and the signal reduction circuit can be eliminated or simplified.

Further, a powerline communication apparatus includes the above-described power supply apparatus and a modem that modulates and demodulates the communication signal. In the power line communication apparatus, the power supplier supplies the power supplied via the power receiver to the modem.

The configuration above allows power supply to the modem or to an external device with no attenuation of the communication signal, and thereby achieves the power line communication apparatus that requires no or a simplified signal reduction circuit.

DETAILED DESCRIPTION

The embodiments are explained in the following, with reference to the above-described drawings. In the present embodiments, configuration examples describe a communication system performs communication with another communication apparatus on a balanced transmission line, using, for example, a power line as a transmission line for communication.

First Embodiment

Figure 1:
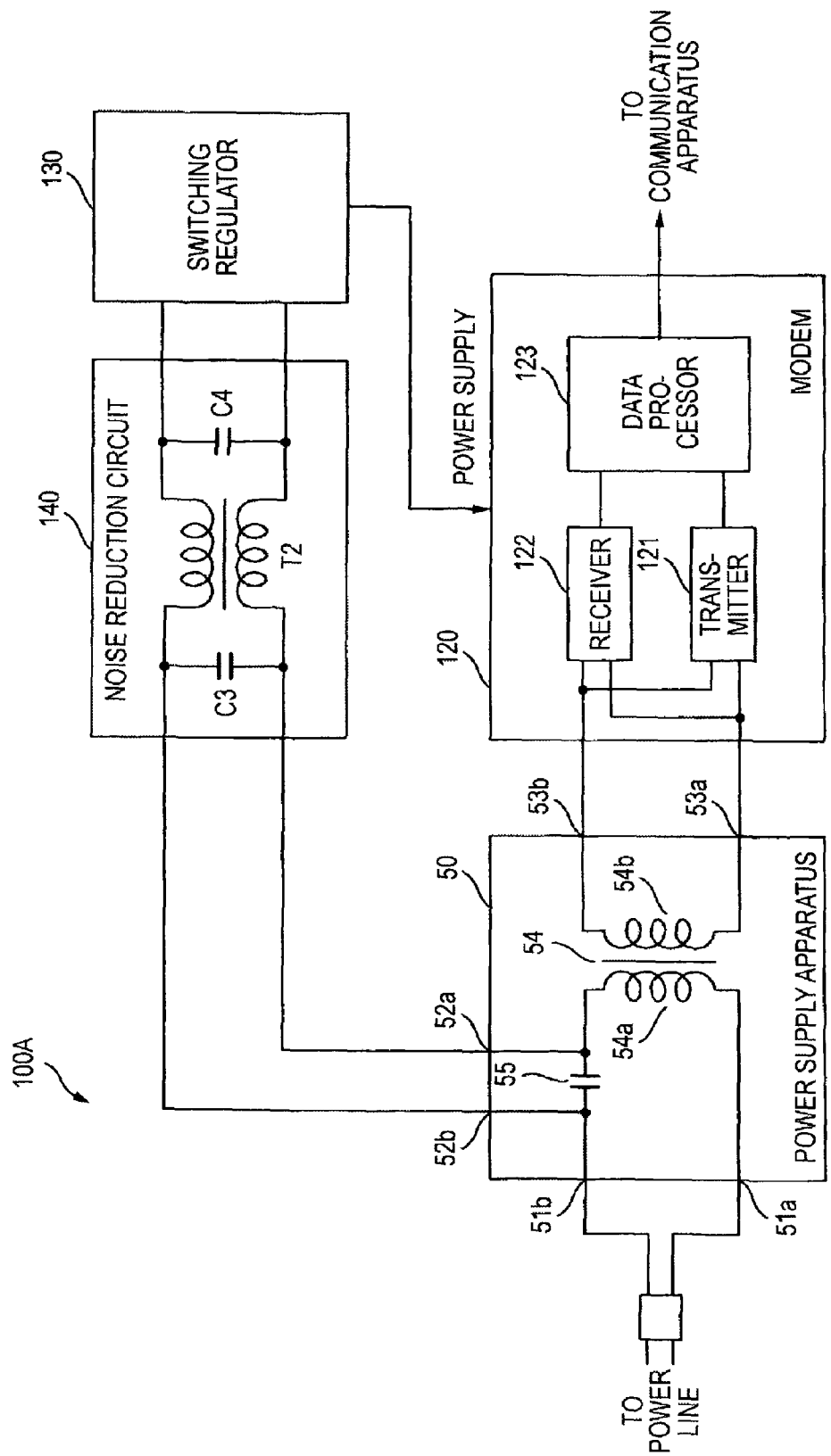
FIG. 1 illustrates a configuration of a power line communication apparatus provided with a power supply apparatus according to a first embodiment.

FIG. 1 illustrates a configuration of a power line communication apparatus provided with a power supply apparatus according to a first embodiment. Power line communication apparatus 100A includes power supply apparatus 50, modem 120, switching regulator 130, and noise reduction circuit 140. Switching regulator 130 is an example of regulator that generates direct voltage based on the predetermined voltage such as 120VAC.

Power supply apparatus 50 is connected to a power line via a commercial power outlet and the like. Power supply apparatus 50 supplies power to switching regulator 130 and transmits to modem 120 a communication signal of power line communication over the power line. Modem 120 is connected to an communication apparatus, such as a personal computer (PC), a video device, and an audio device. Switching regulator 130 generates a direct voltage of a predetermined value and supplies power to modem 120, an external peripheral device, and the like.

Power supply apparatus 50 of the first embodiment includes a pair of power reception terminals 51a and 51b, which correspond to a power receiver; a pair of power supply terminals 52a and 52b, which correspond to a power supplier; a pair of signal input/output terminals 53a and 53b, which correspond to a signal input/output unit; coupled transformer 54 that inputs and outputs the communication signal; and capacitor 55 that has high impedance to a commercial power supply frequency and low impedance to a communication signal frequency. That is, capacitor 55 has impedance characteristics such that impedance at the first frequency (e.g., 50 Hz or 60 Hz) is higher than impedance at the second frequency (e.g., 4 to 30 MHz). Coupled transformer 54 is an example of a transformer. Primary winding 54a of coupled transformer 54 is connected between one power reception terminal 51a and one power supply terminal 52a. The other power reception terminal 51b and the other power supply terminal 52b are connected. Capacitor 55 is connected between one power supply terminal 52a and the other power supply terminal 52b. One end of secondary winding 54b of coupled transformer 54 is connected to one signal input/output terminal 53a. The other end of secondary winding 54b of coupled transformer 54 is connected to the other signal input/output terminal 53b.

In other words, capacitor 55 is connected in series to primary winding 54a of coupled transformer 54. Primary winding 54a of coupled transformer 54 and capacitor 55 are connected in parallel to the pair of power reception terminals 51a and 51b. The pair of power supply terminals 52a and 52b are connected to both ends of capacitor 55. The pair of signal input/output terminals 53a and 53b are connected to both ends of secondary winding 54b of coupled transformer 54.

Power supply apparatus 50 can supply power to a power load (switching regulator 130) connected to power supply terminals 52a and 52b via primary winding 54a of coupled transformer 54. Capacitor 55 provides the low impedance to the communication signal frequency (e.g., 4 to 30 MHz) between power supply terminals 52a and 52b. Thereby, the communication signal can be input and output via coupled transformer 54, while being prevented from flowing to a power load side (noise reduction circuit 140 and switching regulator 130) connected to power supply terminals 52a and 52b. Thus, power can be supplied to the power load without attenuating the communication signal.

As described above, capacitor 55 that has the impedance sufficiently high to the commercial power supply frequency and sufficiently low to the communication signal frequency (e.g., 0.01 µF to 0.1 µF) is inserted in series to coupled transformer 54. Power is supplied to the power supply apparatus or to the peripheral device from the both ends of capacitor 55. A value selected for capacitor 55 is, for example, 0.047 µF or the like, which provides the sufficiently high impedance to the commercial power supply frequency (e.g., 50 Hz or 60 Hz) and low to the communication signal, and prevents electric shock due to energy charged in capacitor 55.

In the case above, the impedance of capacitor 55 is sufficiently high at 56.5 kΩ to the commercial power supply and sufficiently low at a maximum of 0.85 Ω at 4 MHz in power line communication that uses frequencies from 4 to 30 MHz for the communication signal. Therefore, capacitor 55 becomes equivalent to be short circuited to the communication signal frequency. Further, noise reduction circuit 140, which is inserted in parallel to capacitor 55, is hardly affected even at the low impedance.

Figure 20:
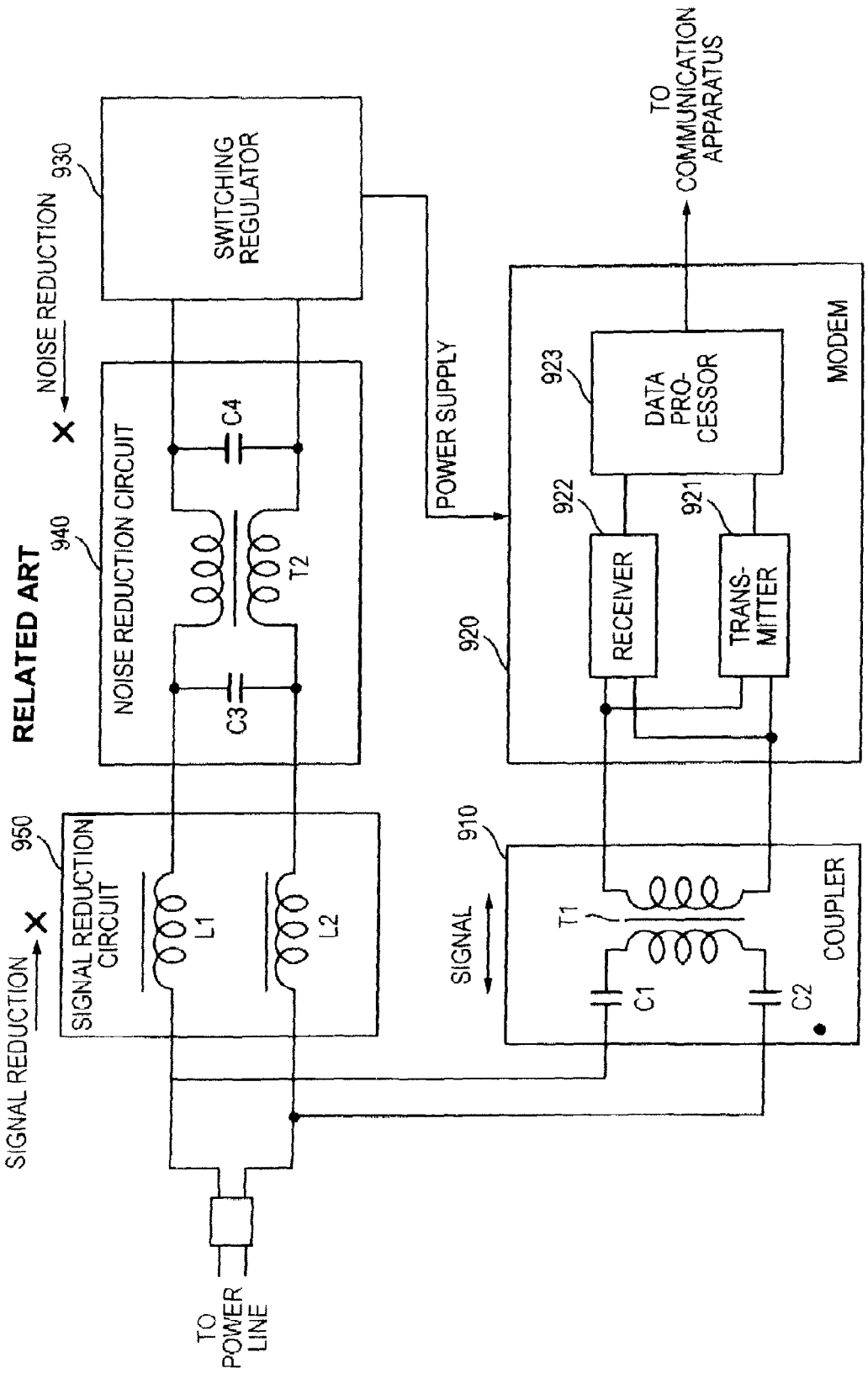
FIG. 20 is a block diagram illustrating a configuration example of a power line communication apparatus.

The impedance between the both ends of capacitor 55 is sufficiently low to the communication signal, and thus the impedance on the power source side (the noise reduction circuit side) does not need to be raised for the communication signal frequency. Therefore, a signal reduction circuit shown in FIG. 20 is no longer required. Even when the signal reduction circuit is provided, a configuration thereof can be simplified.

According to the first embodiment described above, when the switching regulator and the modem of power line communication apparatus 100A are connected, the coupled transformer and the switching regulator are connected in series, thus eliminating or simplifying the signal reduction circuit provided between the switching regulator and the power supply apparatus. Thereby, when power line communication apparatus 100A is connected and used-with a high-power-consumption device (e.g., a plasma display), for example, the signal reduction circuit can be downsized or eliminated, thus easily achieving the power supply apparatus capable of supplying power without attenuating the transmission signal.

Second Embodiment

Figure 2:
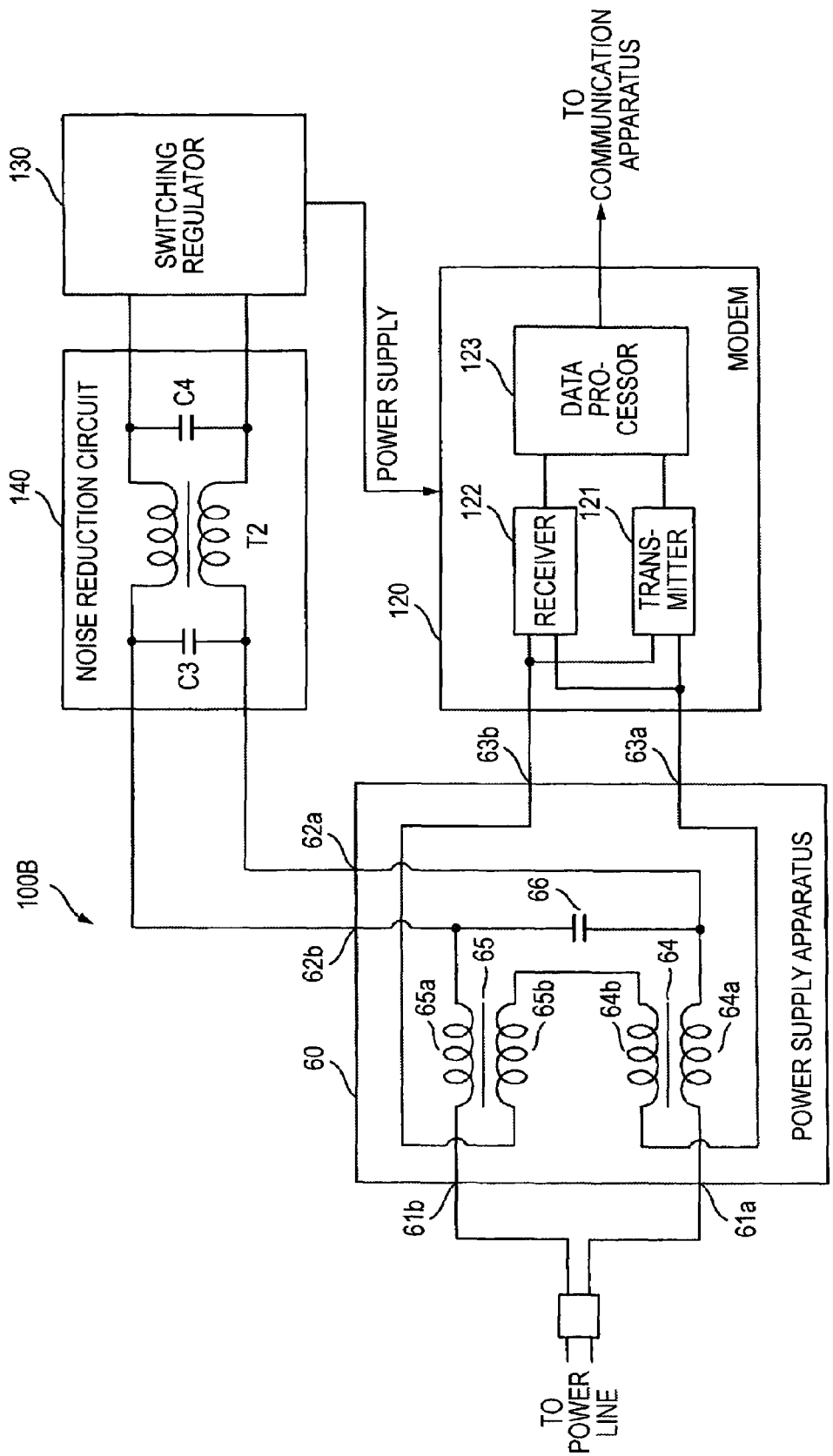
FIG. 2 illustrates a configuration of a power line communication apparatus provided with a power supply apparatus according to a second embodiment.

FIG. 2 illustrates a configuration of a power line communication apparatus provided with a power supply apparatus according to a second embodiment. Described in the second embodiment is another configuration example of the power supply apparatus. Power line communication apparatus 100B includes power supply apparatus 60, modem 120, switching regulator 130, and noise reduction circuit 140.

Power supply apparatus 60 of the second embodiment includes a pair of power reception terminals 61a and 61b, which correspond to a power receiver; a pair of power supply terminals 62a and 62b, which correspond to a power supplier; a pair of signal input/output terminals 63a and 63b, which correspond to a signal input/output unit; first coupled transformer 64 and second couple transformer 65 that input and output a communication signal; and capacitor 66 that has high impedance to a commercial power supply frequency and low impedance to a communication signal frequency. Primary winding 64a of first coupled transformer 64 is connected between one power reception terminal 61a and one power supply terminal 62a. Primary winding 65a of second coupled transformer 65 is connected between the other power reception terminal 61b and the other power supply terminal 62b.

Capacitor 66 is connected between one power supply terminal 62a and the other power supply terminal 62b. Secondary winding 64b of first coupled transformer 64 and secondary winding 65b of second coupled transformer 65 are connected in series and electrically in phase (i.e., so as not to cancel magnetic fluxes each other), and ends thereof are connected to the pair of signal input/output terminals 63a and 63b respectively.

In other words, to the pair of power reception terminals 61a and 61b, one ends of primary windings 64a and 65a of coupled transformers 64 and 65 are connected in series respectively. Capacitor 66 is connected between the other ends of primary windings 64a and 65a of coupled transformers 64 and 65 respectively. To both ends of capacitor 66, the pair of power supply terminals 62a and 62b are connected. One ends of secondary windings 64b and 65b of coupled transformers 64 and 65 are connected electrically in phase (i.e., so as not to cancel magnetic fluxes each other). The pair of signal input/output terminals 63a and 63b are connected to the other ends of secondary windings 64b and 65b of coupled transformers 64 and 65.

Power supply apparatus 60 can supply power to a power load (switching regulator 130) connected to power supply terminals 62a and 62b via primary winding 64a of first coupled transformer 64 and primary winding 65a of second coupled transformer 65. Capacitor 66 provides the low impedance to the communication signal frequency between power supply terminals 62a and 62b. Thereby, the communication signal can be input and output via coupled transformers 64 and 65, while being prevented from flowing to a power load side (noise reduction circuit 140 and switching regulator 130) connected to power supply terminals 62a and 62b. Thus, power can be supplied to the power load without attenuating the communication signal is not attenuated.

As described above, coupled transformers 64 and 65 are provided to respective power lines. One ends of primary windings 64a and 65a of coupled transformers 64 and 65 are connected to the power lines. Connected in series between the other ends of primary windings 64a and 65a is the capacitor that has the impedance sufficiently high to the commercial power supply frequency and sufficiently low to the communication signal frequency (e.g., 0.01 µF to 0.1 µF). Power is supplied to power line communication apparatus 100B or to a peripheral device from the both ends of capacitor 66. At the same time, secondary windings 64b and 65b of two coupled transformers 64 and 65 are connected so that voltages thereof are combined to allow input and output of the signal. A value selected for capacitor 66 is, for example, 0.047 µF or the like, which provides the sufficiently high impedance to the commercial power supply frequency and the low-impedance to the communication signal, and prevents a risk of electric shock due to energy charged in capacitor 66.

The impedance between the both ends of capacitor 66 is sufficiently low to the communication signal, and thus the impedance on the power source side (the noise reduction circuit side) does not need to be raised for the communication signal frequency. Therefore, a signal reduction circuit shown in FIG. 20 is no longer required. Further, separately providing coupled transformers 64 and 65 to the respective power lines achieves good balancing. Furthermore, separating coupled transformers 64 and 65 into two provides an advantage where magnetic saturation is unlikely to occur due to a wide margin for the magnetic saturation.

According to the second embodiment described above, the pair of power lines that function as transmission lines are separately provided with the coupled transformers. The two coupled transformers and the switching regulator are connected in series, thus eliminating or simplifying the signal reduction circuit provided between the switching regulator and the power supply apparatus. Further, providing each of the transmission lines with the coupled transformer improves balancing. Furthermore, employing the two coupled transformers prevents occurrence of the magnetic saturation.

Third Embodiment

Figure 3:
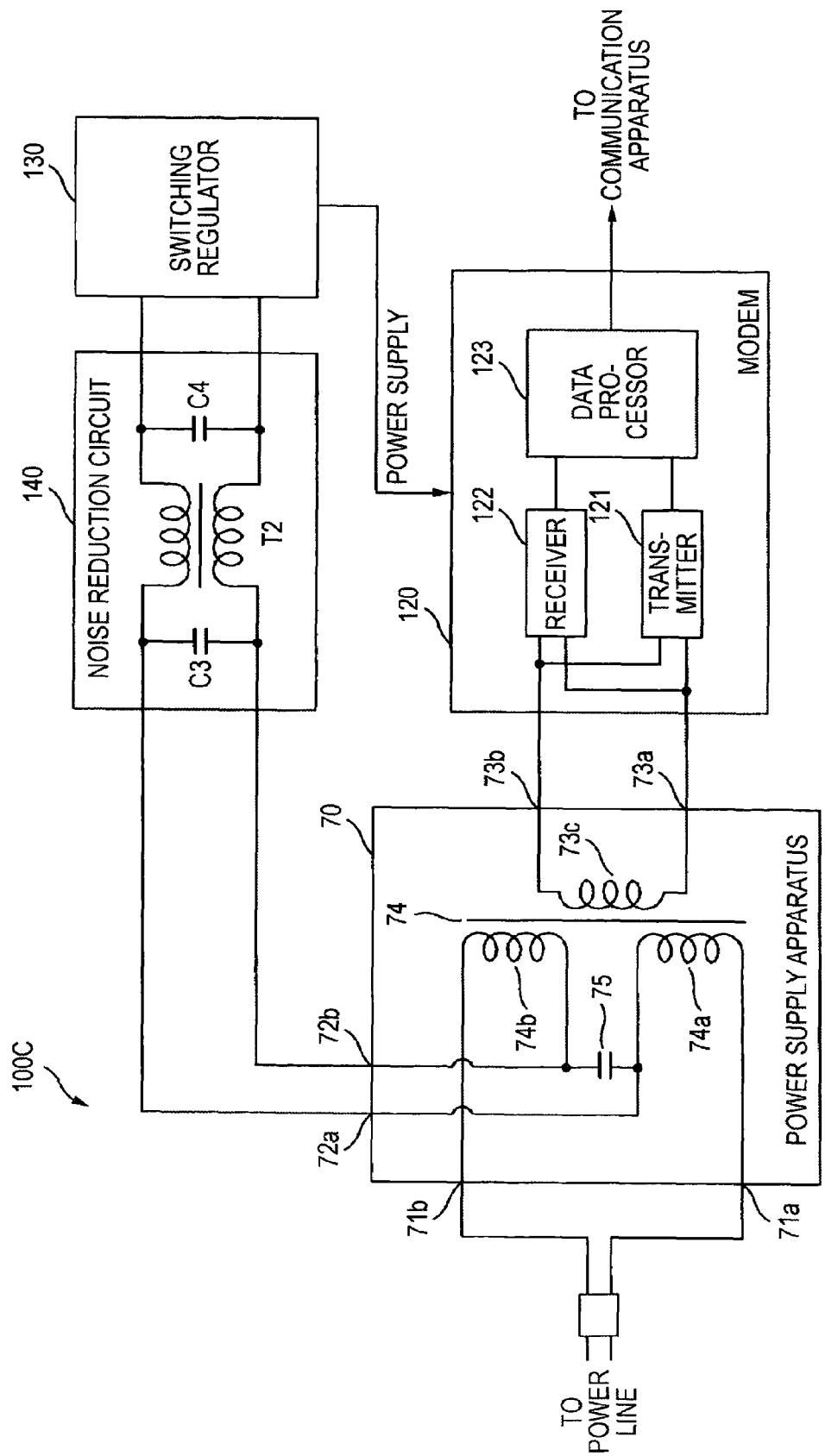
FIG. 3 illustrates a configuration of a power line communication apparatus provided with a power supply apparatus according to a third embodiment.

FIG. 3 illustrates a configuration of a power line communication apparatus provided with a power supply apparatus according to a third embodiment. Described in the third embodiment is another configuration example of the power supply apparatus. Power line communication apparatus 100C includes power supply apparatus 70, modem 120, switching regulator 130, and noise reduction circuit 140.

Power supply apparatus 70 of the third embodiment includes a pair of power reception terminals 71a and 71b, which correspond to a power receiver; a pair of power supply terminals 72a and 72b, which correspond to a power supplier; a pair of signal input/output terminals 73a and 73b, which correspond to a signal input/output unit; coupled transformer 74 that inputs and outputs a communication signal, wherein a primary winding is divided into two; and capacitor 75 that has high impedance to a commercial power supply frequency and low impedance to a communication signal frequency. One power reception terminal 71a is connected to first primary winding 74a of coupled transformer 74. The other end of first primary winding 74a of coupled transformer 74 is connected to one power supply terminal 72a. The other power supply terminal 71b is connected to one end of second primary winding 74b of coupled transformer 74. The other end of second primary winding 74b of coupled transformer 74 is connected to the other power supply terminal 72b. Capacitor 75 is connected between one power supply terminal 72a and the other power supply terminal 72b. One end of secondary winding 74c of coupled transformer 74 is connected to one signal input/output terminal 73a. The other end of secondary winding 74c of coupled transformer 74 is connected to the other signal input/output terminal 73b.

In other words, coupled transformer 74 has equally divided primary windings 74a and 74b. Capacitor 75 is connected to a middle point of primary windings 74a and 74b. Primary windings 74a and 74b of coupled transformer 74 and capacitor 75 are connected in parallel to the pair of power reception terminals 71a and 71b. The pair of power supply terminals 72a and 72b are connected to both ends of capacitor 75. The pair of signal input/output terminals 73a and 73b are connected to both ends of secondary winding 74c of coupled transformer 74.

Power supply apparatus 70 can supply power to a power load (switching regulator 130) connected to power supply terminals 72a and 72b via first and second primary windings 74a and 74b of coupled transformer 74. Capacitor 75 provides the low impedance to the communication signal frequency between power supply terminals 72a and 72b. Thereby, the communication signal can be input and output via coupled transformer 74, while being prevented from flowing to a power load side (the noise reduction circuit and the switching regulator) connected to power supply terminals 72a and 72b. Thus, power can be supplied to the power load without attenuating the communication signal.

As described above, the primary side of coupled transformer 74 is divided into two windings. Inserted at the middle point thereof is the capacitor that has the impedance sufficiently high to the commercial power supply frequency and sufficiently low to the communication signal frequency (e.g., 0.01 µF to 0.1 µF). Power is supplied to power line communication apparatus 100C or to a peripheral device from the both ends of capacitor 75. At the same time, the signal is input and output via coupled transformer 74. A value selected for capacitor 75 is, for example, 0.047 µF or the like, which provides the sufficiently high impedance to the commercial power supply frequency and low impedance to the communication signal, and prevents electric shock due to energy charged in capacitor 75.

The impedance between the both ends of capacitor 75 is sufficiently low to the communication signal, and thus the impedance on the power source side (the noise reduction circuit side) does not need to be raised for the communication signal frequency. Therefore, a signal reduction circuit shown in FIG. 20 is no longer required. Providing only one coupled transformer 74 contributes to a reduction in the number of parts. Further, balancing is good since the primary winding of coupled transformer 74 is divided into two to form primary windings 74a and 74b, which are respectively provided to a pair of power lines that function as the transmission lines.

According to the third embodiment described above, the primary winding of the coupled transformer is divided into two, which are respectively provided to the pair of power lines that function as the transmission lines, and the primary windings and the switching regulator are connected in series, thus eliminating or simplifying the signal reduction circuit between the switching regulator and the power supply apparatus. Further, providing the respective transmission lines with the divided primary windings of the coupled transformer improves balancing. Furthermore, employing one coupled transformer reduces the number of parts and simplifies the configuration.

Modifications

Figure 4:
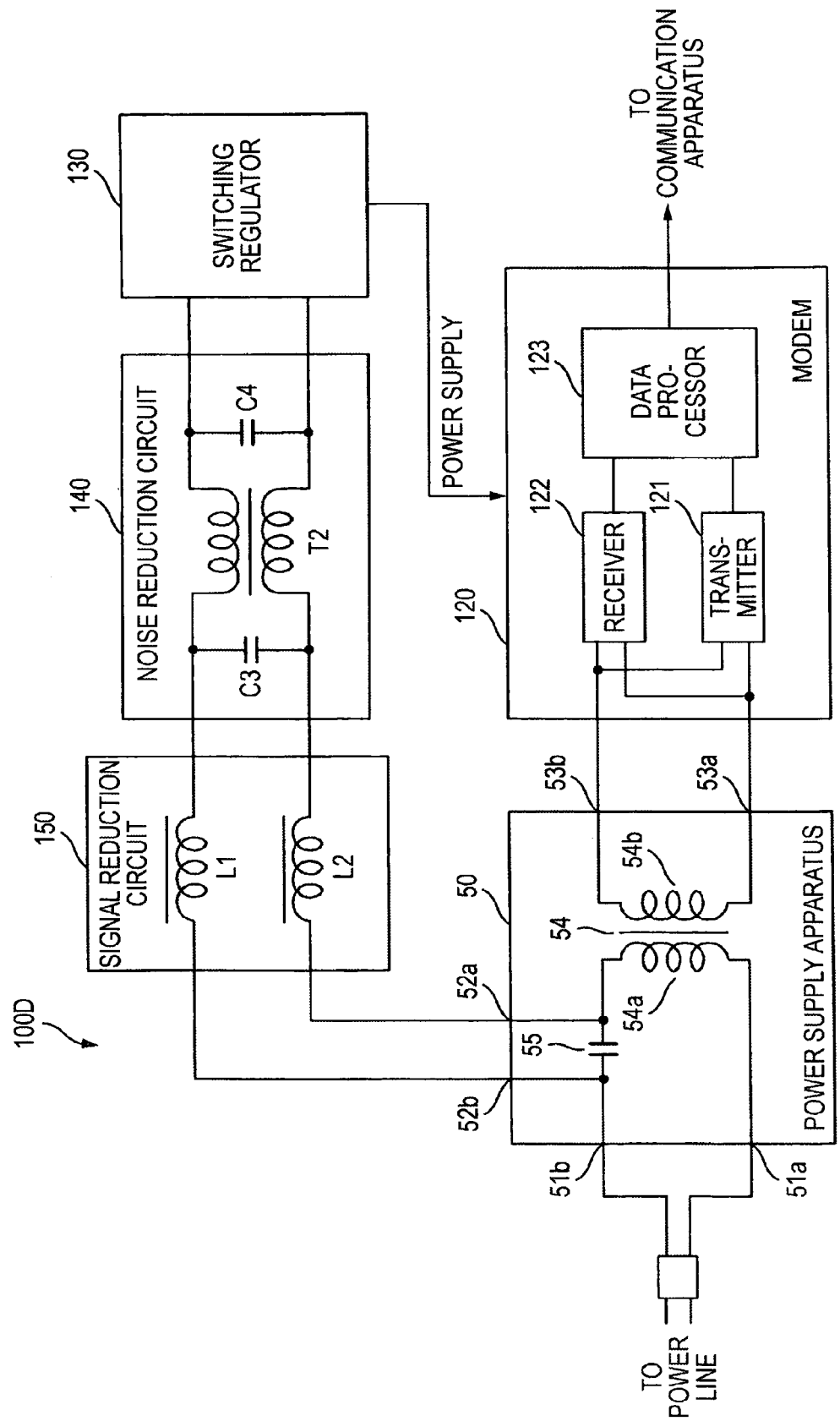
FIG. 4 illustrates a configuration of a modified power line communication apparatus provided with the power supply apparatus according to the first embodiment.
Figure 5:
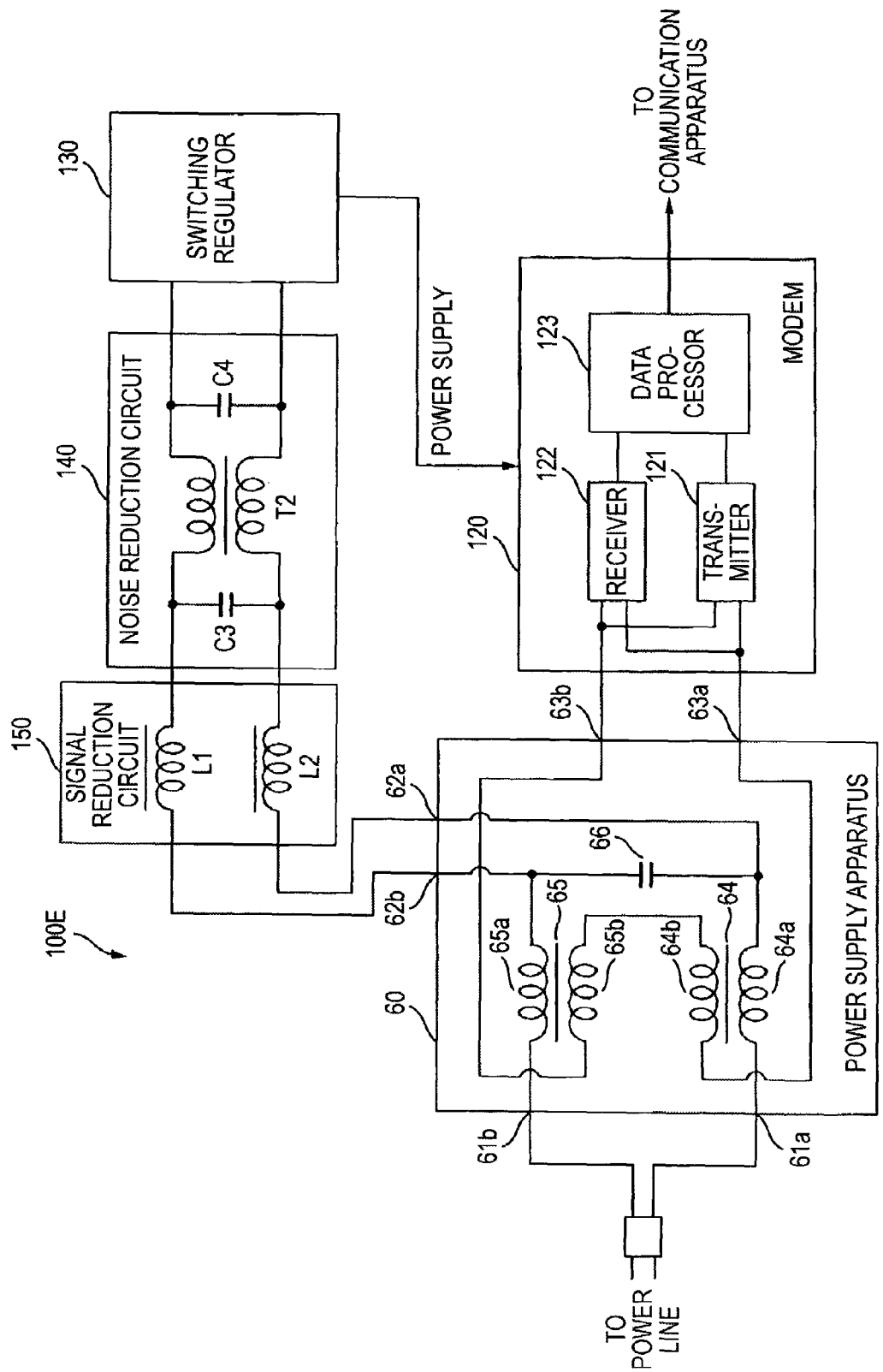
FIG. 5 illustrates a configuration of a modified power line communication apparatus provided with the power supply apparatus according to the second embodiment.
Figure 6:
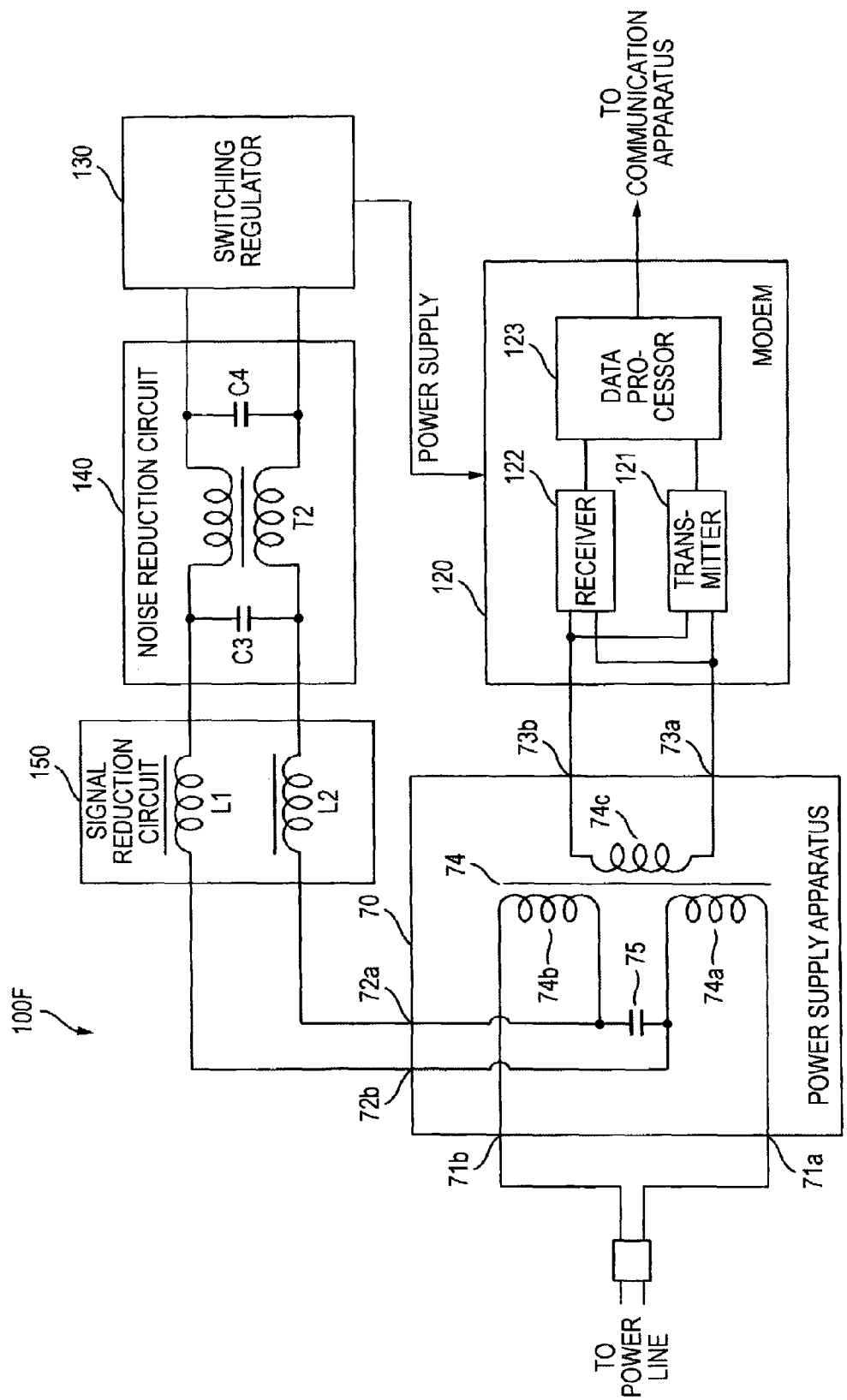
FIG. 6 illustrates a configuration of a modified power line communication apparatus provided with the power supply apparatus according to the third embodiment.

FIG. 4 illustrates a configuration of a modified power line communication apparatus provided with the power supply apparatus according to the first embodiment; FIG. 5 illustrates a configuration of a modified power line communication apparatus provided with the power supply apparatus according to the second embodiment; FIG. 6 illustrates a configuration of a modified power line communication apparatus provided with the power supply apparatus according to the third embodiment.

In the modifications shown in FIGS. 4 to 6, power line communication apparatuses 100D, 100E, and 100F are provided with signal reduction circuit 150 at a prior step to noise reduction circuit 140. Low impedance between power supply terminals in power supply apparatuses 50, 60, and 70 according to the present embodiments provides substantial effect when signal reduction circuit 150 is inserted.

Therefore, specification requirements for respective coils (coils L1 and L2) in signal reduction circuit 150 are lowered, thus contributing to easy designing of coils L1 and L2. In order to obtain the signal reduction effect to a normal line impedance of several hundred Ω, it is conventionally required to ensure sufficiently high impedance, and thus it is preferable to ensure an impedance of several KΩ or more in a signal frequency band. Meanwhile, when power supply apparatuses 50, 60, and 70 according to the present embodiments are used, it is only required to ensure sufficiently high impedance to an impedance of several tenths of Ω to several Ω of capacitors 55, 66, and 75 connected between the power supply terminals. It is thus sufficient to ensure several tens of Ω or more. Therefore, an L value (a coil inductance value) for reduction of the signal can be low.

Having the low coil inductance for reduction of the signal as described above leads to a wide margin for magnetic saturation. In addition, the low inductance allows use of a small core. Further, it is acceptable that some components of parallel stray capacitance exist in the signal reduction coils.

Applications

Figure 7:
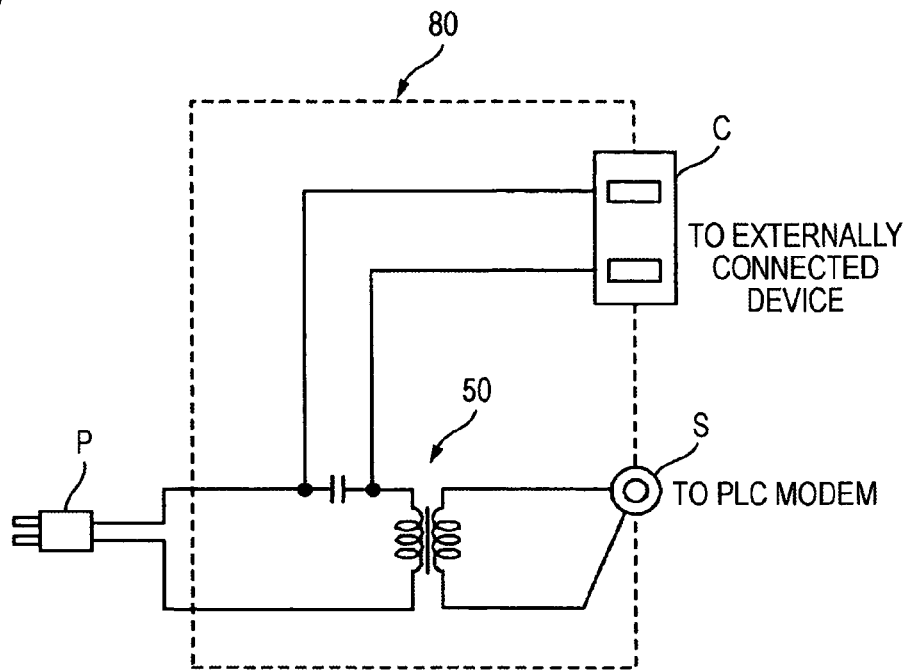
FIG. 7 is a circuit configuration diagram illustrating an example of an adapter apparatus provided with the power supply apparatus according to the first embodiment, as a first example of the adapter apparatus.

FIG. 7 is a circuit configuration diagram illustrating an example of an adapter apparatus provided with the power supply apparatus according to the first embodiment, as a first example of the adapter apparatus. Adapter apparatus 80 of the first example includes: power supply apparatus 50 according to the first embodiment shown in FIG. 1; plug P, which corresponds to a power reception terminal; outlet C, which corresponds to a power supply terminal; and modem connection terminal S for PLC (power line communication), which corresponds to a signal input/output terminal. In the configuration, connecting a power line of an external peripheral device to outlet C supplies power, and connecting a PLC modem, which is a power line communication apparatus, to modem connection terminal S allows transmission and reception of a communication signal for power line communication.

Figure 8:
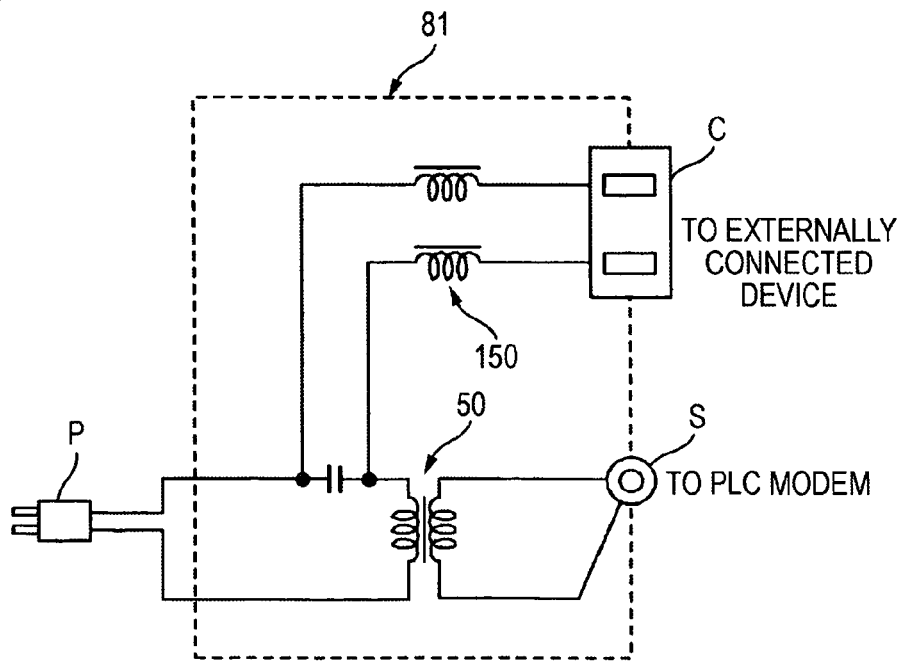
FIG. 8 is a circuit configuration diagram illustrating another example of the adapter apparatus provided with the power supply apparatus according to the first embodiment, as a second example of the adapter apparatus.

FIG. 8 is a circuit configuration diagram illustrating another example of the adapter apparatus provided with the power supply apparatus according to the first embodiment, as a second example of the adapter apparatus. Compared to adapter apparatus 80 of the first example shown in FIG. 7, adapter apparatus 81 of the second example further includes signal reduction circuit 150 on lines connected to outlet C.

Figure 9:
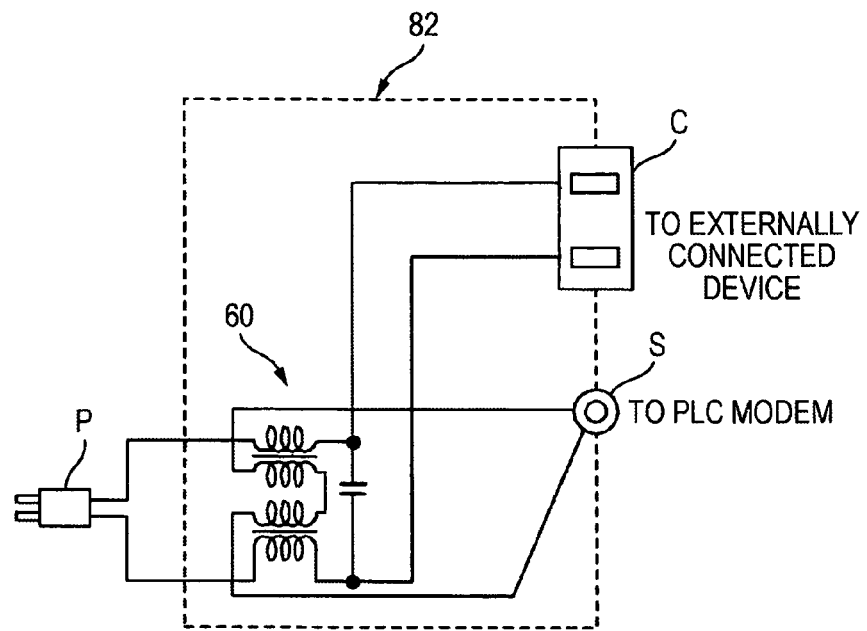
FIG. 9 is a circuit configuration diagram illustrating an example of an adapter apparatus provided with the power supply apparatus according to the second embodiment, as a third example of the adapter apparatus.

FIG. 9 is a circuit configuration diagram illustrating an example of an adapter apparatus provided with the power supply apparatus according to the second embodiment, as a third example of the adapter apparatus. Adapter apparatus 82 of the third example includes: power supply apparatus 60 according to the second embodiment shown in FIG. 2; plug P, which corresponds to a power reception terminal; outlet C, which corresponds to a power supply terminal; and modem connection terminal S for PLC, which corresponds to a signal input/output terminal.

Figure 10:
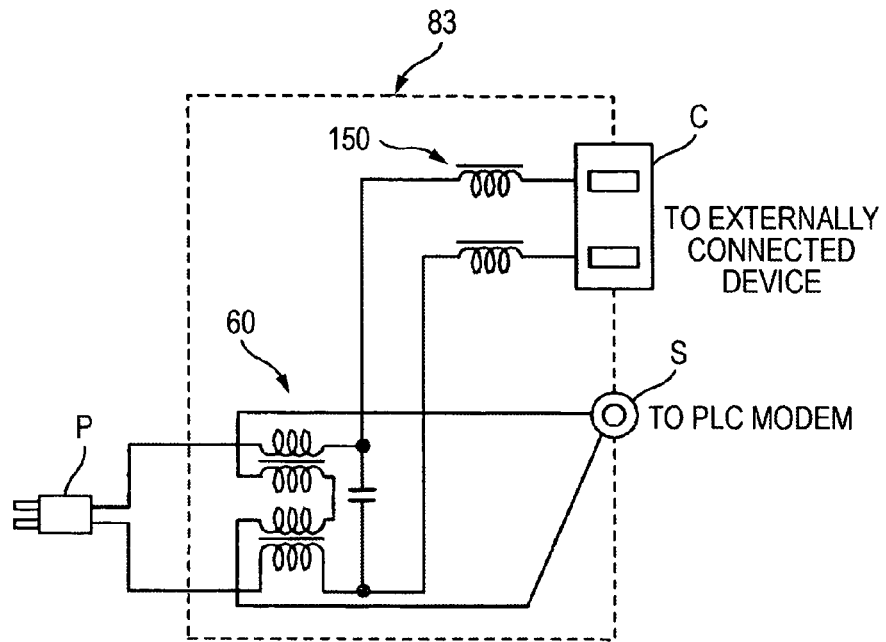
FIG. 10 is a circuit configuration diagram illustrating another example of the adapter apparatus provided with the power supply apparatus according to the second embodiment, as a fourth example of the adapter apparatus.

FIG. 10 is a circuit configuration diagram illustrating another example of the adapter apparatus provided with the power supply apparatus according to the second embodiment, as a fourth example of the adapter apparatus. Compared to adapter apparatus 82 of the third example shown in FIG. 9, adapter apparatus 83 of the fourth example further includes signal reduction circuit 150 on lines connected to outlet C.

Figure 11:
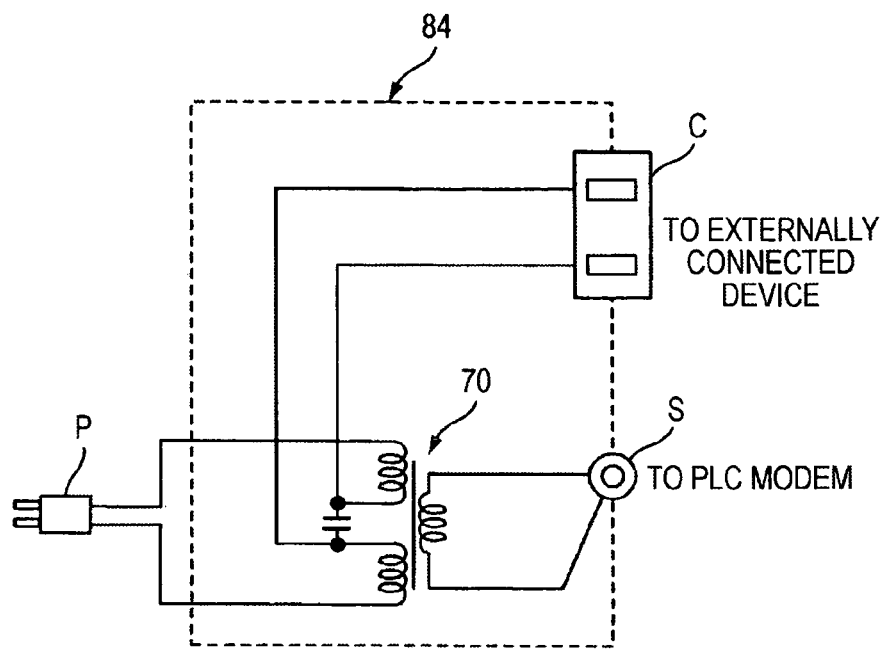
FIG. 11 is a circuit configuration diagram illustrating an example of an adapter apparatus provided with the power supply apparatus according to the third embodiment, as a fifth example of the adapter apparatus.

FIG. 11 is a circuit configuration diagram illustrating an example of an adapter apparatus provided with the power supply apparatus according to the third embodiment, as a fifth example of the adapter apparatus. Adapter apparatus 84 of the fifth example includes: power supply apparatus 70 according to the third embodiment shown in FIG. 3; plug P, which corresponds to a power reception terminal; outlet C, which corresponds to a power supply terminal; and modem connection terminal S for PLC, which corresponds to a signal input/output terminal.

Figure 12:
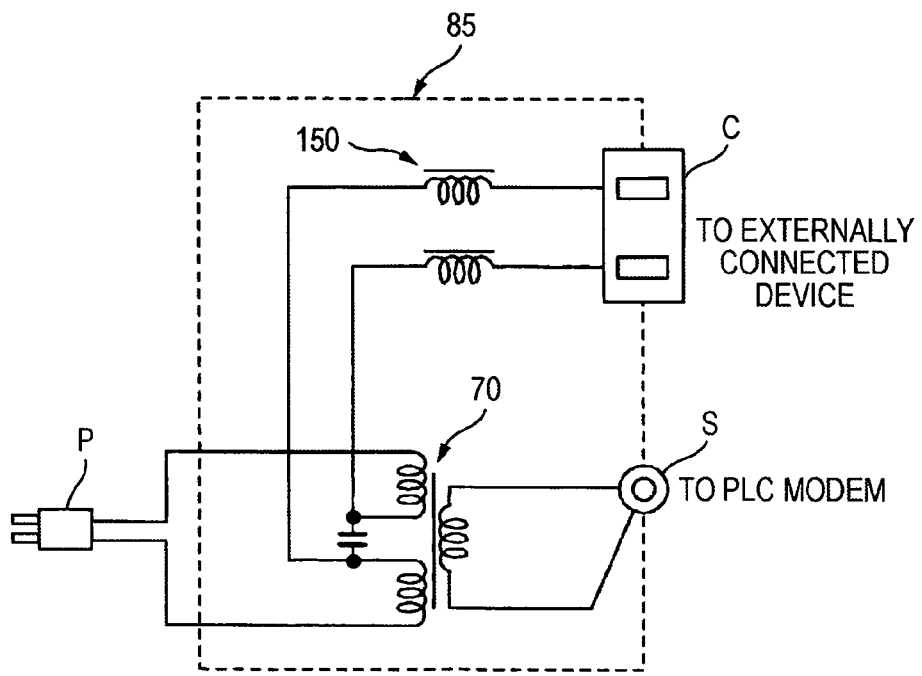
FIG. 12 is a circuit configuration diagram illustrating another example of the adapter apparatus provided with the power supply apparatus according to the third embodiment, as a sixth example of the adapter apparatus.

FIG. 12 is a circuit configuration diagram illustrating another example of the adapter apparatus provided with the power supply apparatus according to the third embodiment, as a sixth example of the adapter apparatus. Compared to adapter apparatus 84 of the fifth example shown in FIG. 11, adapter apparatus 85 of the sixth example further includes signal reduction circuit 150 on lines connected to outlet C.

Figure 13:
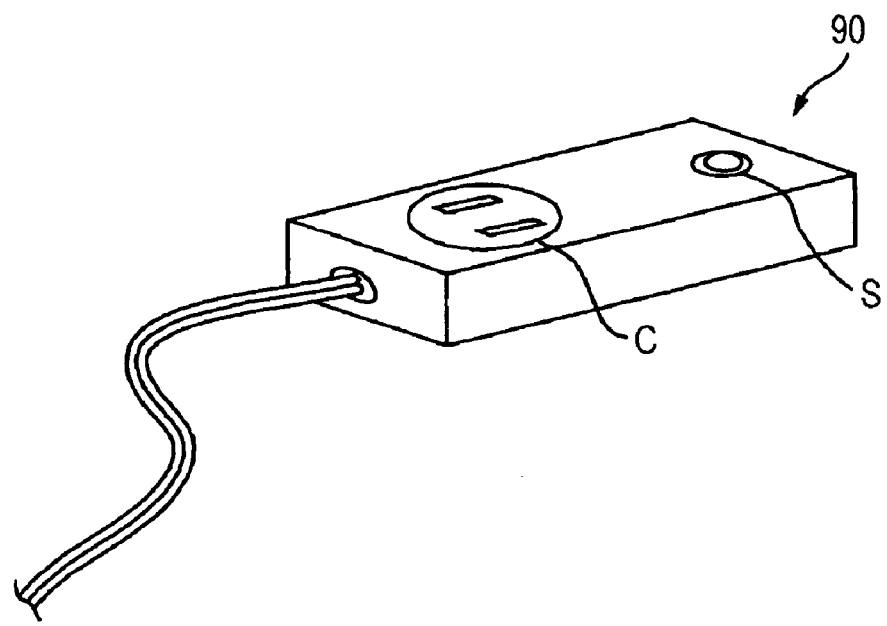
FIG. 13 is an external view illustrating a configuration of an extension cord apparatus internally provided with the power supply apparatus according to the present embodiments.

FIG. 13 is an external view illustrating a configuration of an extension cord apparatus internally provided with the power supply apparatus according to the present embodiments. Extension cord apparatus 90 includes: one of power supply apparatuses 50, 60, and 70 according to the present embodiments therein; outlet C, which corresponds to a power supply terminal; and modem connection terminal S, which corresponds to a signal input/output terminal. Further, extension cord apparatus 90 may include signal reduction circuit 150 therein. In the configuration where a coupler for power line communication is provided to the extension cord that connects to a power line, connecting a power line of an external peripheral device to outlet C supplies power, and connecting a PLC modem to modem connection terminal S allows transmission and reception of a communication signal for power line communication.

Figure 14:
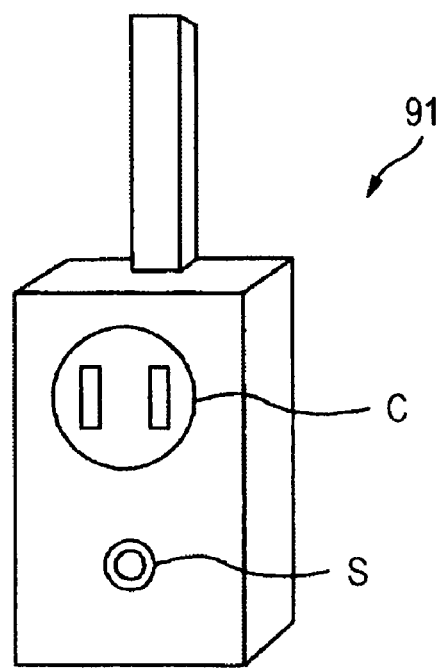
FIG. 14 is an external view illustrating a configuration of a built-in type outlet apparatus internally provided with the power supply apparatus according to the present embodiments.

FIG. 14 is an external view illustrating a configuration of a built-in type outlet apparatus internally provided with the power supply apparatus according to the present embodiments. Outlet apparatus 91 includes: one of power supply apparatuses 50, 60, and 70 according to the present embodiments therein; outlet C, which corresponds to a power supply terminal; and modem connection terminal S, which corresponds to a signal input/output terminal. Further, outlet apparatus 91 may include signal reduction circuit 150 therein. In the configuration where a coupler for power line communication is provided to the outlet portion that connects to a power line, connecting a power line of an external peripheral device to outlet C supplies power, and connecting a PLC modem to modem connection terminal S allows transmission and reception of a communication signal for power line communication.

Figure 15:
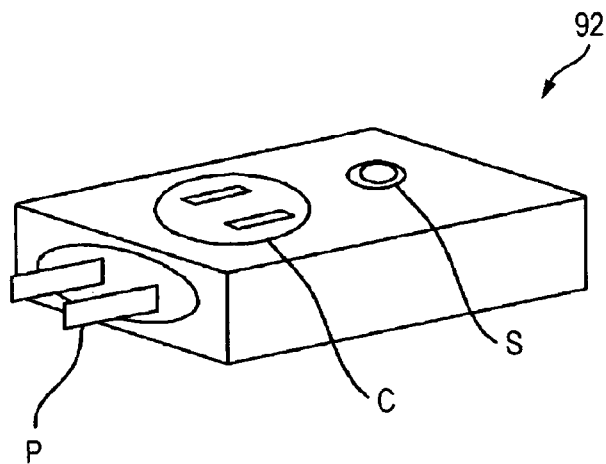
FIG. 15 is an external view illustrating a configuration of a plug adapter apparatus internally provided with the power supply apparatus according to the present embodiments.

FIG. 15 is an external view illustrating a configuration of a plug adapter apparatus internally provided with the power supply apparatus according to the present embodiments. Plug adapter apparatus 92 includes: one of power supply apparatuses 50, 60, and 70 according to the present embodiments therein; plug P, which corresponds to a power reception terminal; outlet C, which corresponds to a power supply terminal; and modem connection terminal S, which corresponds to a signal input/output terminal. Further, plug adapter apparatus 92 may include signal reduction circuit 150 therein. In the configuration where a coupler for power line communication is provided to the plug adapter that connects to a power line, connecting plug P to a commercial power outlet and connecting a power line of an external peripheral device to outlet C supply power, and connecting a PLC modem to modem connection terminal S allows transmission and reception of a communication signal for power line communication.

Figure 16:
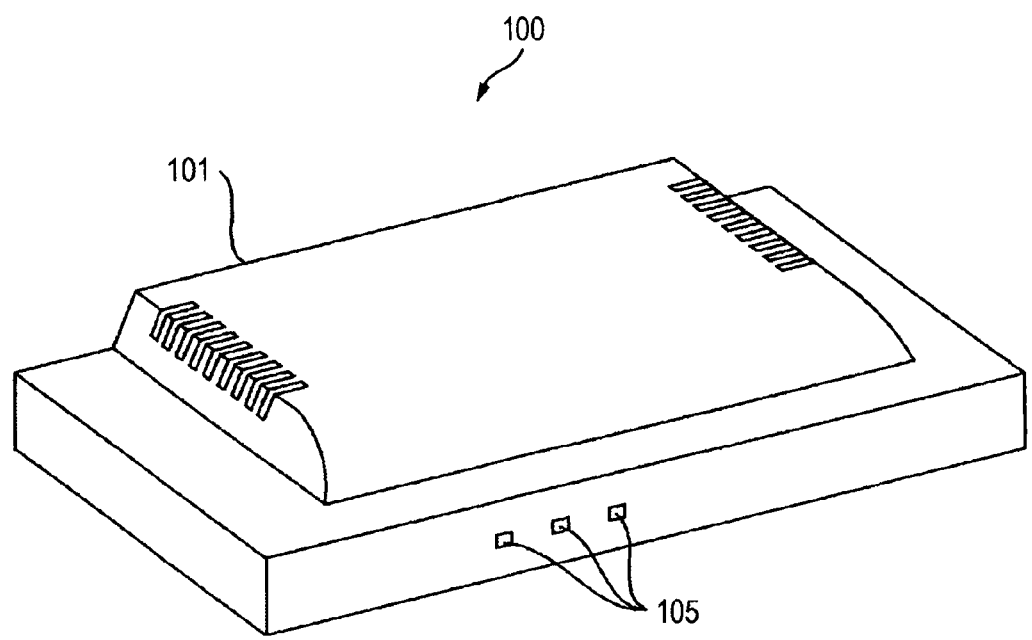
FIG. 16 is a front perspective view of a multi-carrier communication apparatus according to the present embodiments.
Figure 17:
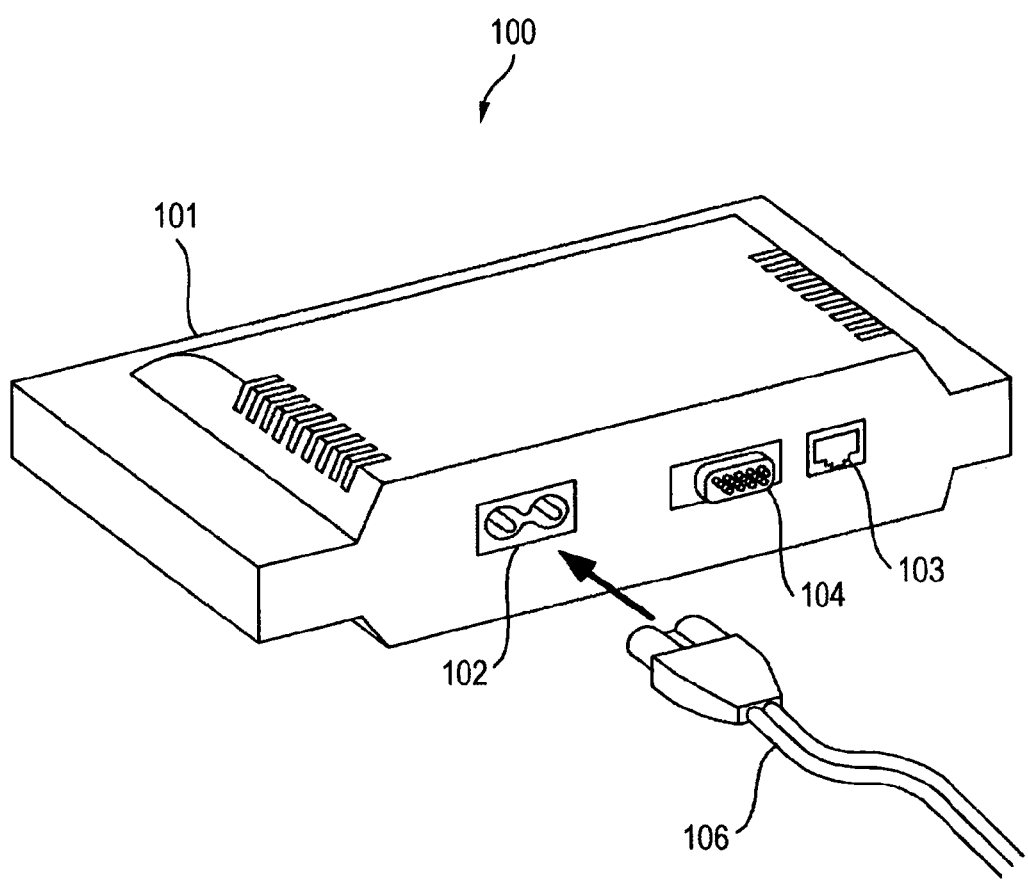
FIG. 17 is a rear perspective view of the multi-carrier communication apparatus according to the present embodiments.
Figure 18:
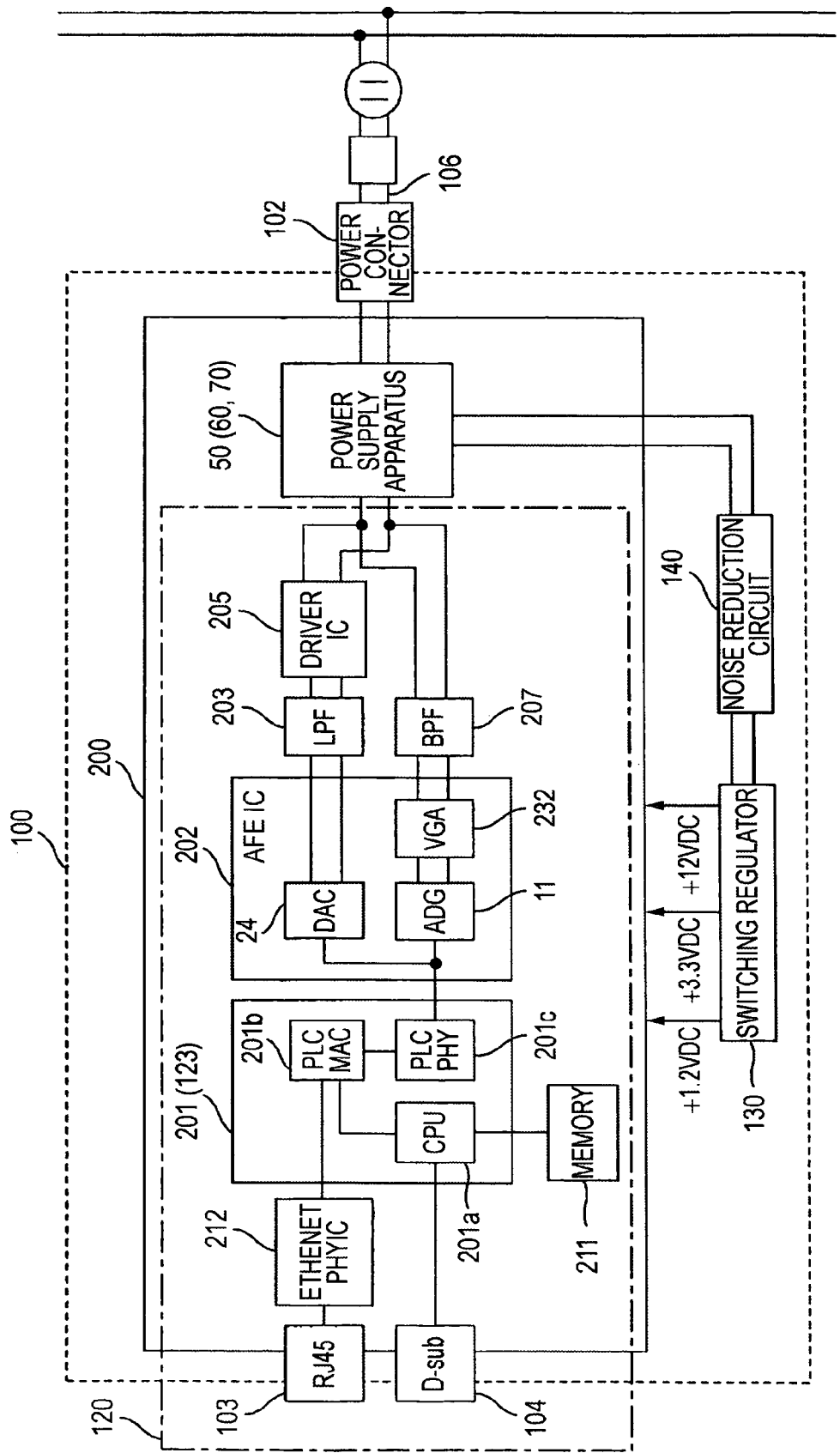
FIG. 18 is a block diagram illustrating a configuration of an electric circuit of the multi-carrier communication apparatus according to the present embodiments.

Provided below is a configuration example of a multi-carrier communication apparatus, which corresponds to the power line communication apparatus shown in FIGS. 1 to 6. FIGS. 16 to 18 show a specific configuration example of the multi-carrier communication apparatus. FIG. 16 is a front perspective view of the multi-carrier communication apparatus. FIG. 17 is a rear perspective view of the multi-carrier communication apparatus. FIG. 18 is a block diagram illustrating a configuration of an electric circuit of the multi-carrier communication.

Multi-carrier communication apparatus 100 includes therein one of power supply apparatuses 50, 60, and 70 according to the present embodiments (hereinafter represented by-power supply apparatus 50). Multi-carrier communication apparatus 100 is a communication apparatus that performs power line communication, which is more specifically formed as a modem (a PLC modem). Needless to say, the multi-carrier communication apparatus is not limited to a modem, but may be formed as an electric appliance (e.g., a home appliance such as a television set) that includes a modem.

Multi-carrier communication apparatus 100 includes circuit module 200, which is an electric circuit as shown in FIG. 18, in case 101 as shown in FIGS. 16 and 17. Provided on a front side of case 101 is display 105 that has LEDs (Light Emitting Diodes) and the like as shown in FIG. 16. Provided on a rear side of chassis 101 are, as shown in FIG. 17, power connector 102; modular jack 103 for LAN (Local Area Network) cable connection, such as RJ-45; and D-sub connector 104 for serial cable connection. To power connector 102, AC cord 106 formed of a parallel cable and the like is connected. A LAN cable (not shown in the figure) is connected to modular jack 103. A serial cable (not shown in the figure) is connected to D-sub connector 104.

As shown in FIG. 18, circuit module 200 and switching regulator 300 are provided inside multi-carrier communication apparatus 100. Switching regulator 300 receives from a commercial AC power (100 VAC) a power line via power supply apparatus 50; generates DC voltages of +1.2V, +3.3V, and +12V; and supplies the voltages to circuit module 200.

Provided inside circuit module 200 are main IC (Integrated Circuit) 201, which corresponds to digital processor 123; AFE (Analog Front End) IC 202; low pass filter (LPF) 203; driver IC 205; power supply apparatus 50 that includes a coupler; band pass filter (BPF) 207; amplifier (AMP) 209; AD conversion IC (ADC IC) 210; memory 211; and Ethernet physical IC (PHY IC) 212.

Main IC 201 includes CPU (Central Processing Unit) 201a, PLC MAC (Power Line Communication Media Access Control) block 201b, and PLC PHY (Power Line Communication Physical layer) block 201c. AFE IC 202 includes D/A converter (DAC) 24, A/D converter (ADC) 11, and variable gain amplifier (VGA) 232.

Circuit module 200 shown in FIG. 18 is capable of transmitting and receiving data to and from another terminal using a multi-carrier signal, such as, for example, an OFDM (Orthogonal Frequency Division Multiplexing) signal. The data communication is performed over the power line as a transmission line for communication, using a predetermined frequency band on the power line. Thus, no special transmission line is required to be installed for communication.

Figure 19:
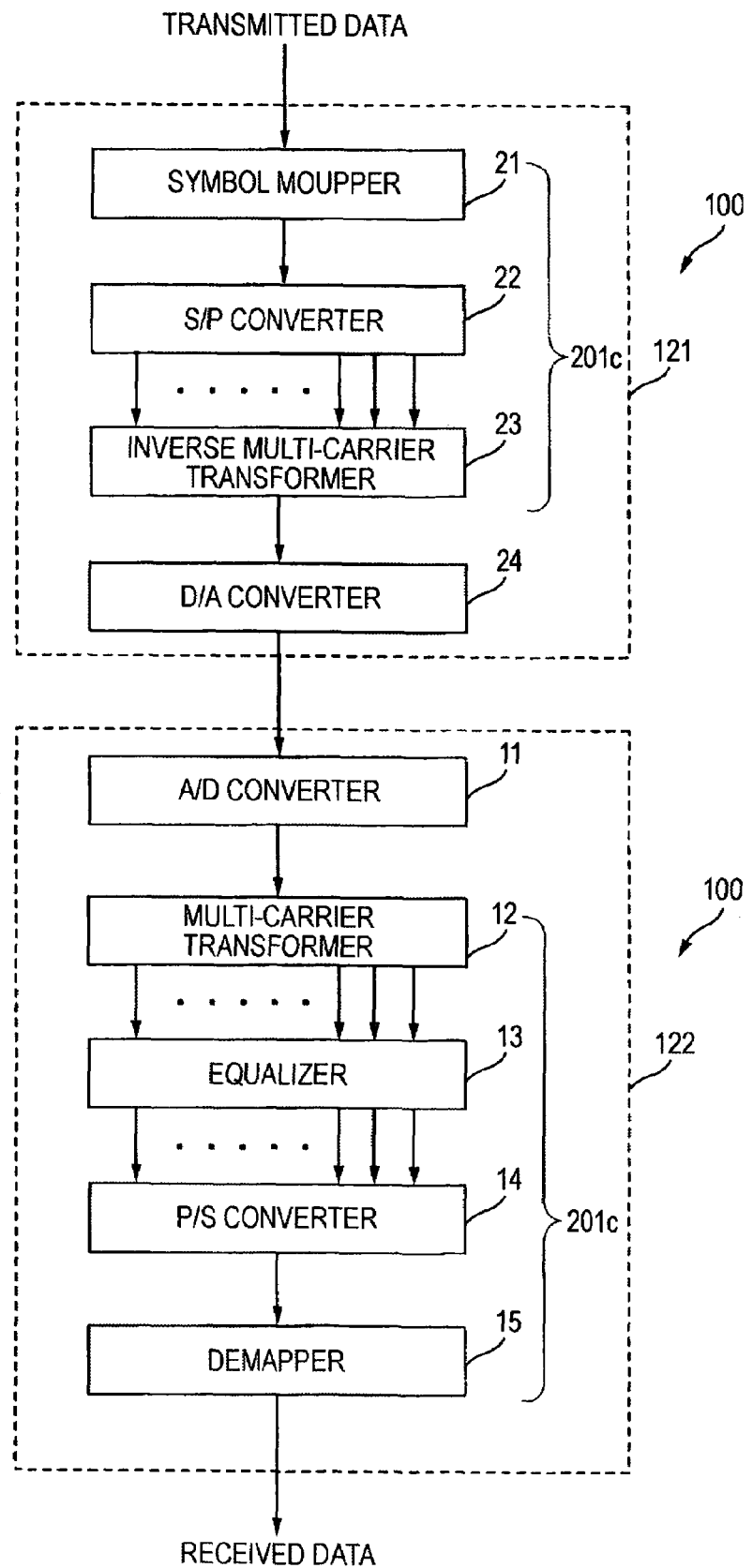
FIG. 19 is a block diagram illustrating a functional configuration of a transmitter and a receiver of the power line communication apparatus according to the present embodiments.

FIG. 19 is a block diagram illustrating a functional configuration of a transmitter and a receiver of the power line communication apparatus according to the present embodiments. FIG. 19 illustrates transmitter 121 and receiver 122 of the power line communication apparatus shown in FIGS. 1 to 6. A portion pertaining to power line communication in circuit module 200 shown in FIG. 18 is illustrated as functional blocks.

Receiver 122 includes: A/D converter 11; multi-carrier transformer 12 that performs desired time-to-frequency transform, such as a Fourier transformer (FFT), a wavelet transformer (DWT), or the like; equalizer 13 that corrects a received signal so as to cancel an effect of the transmission line; P/S converter 14 that converts parallel data to serial data; and demapper 15 that converts mapped symbol data to bit data, which are a received signal. In FIG. 18, receiver 122 performs functions of multi-carrier transformer 12, equalizer 13, P/S converter 14, and demapper 15 in PLF PHY block 201c of main IC 201, and a function of A/D converter 11 in A/D converter 231 of AFE IC 202.

Transmitter 121 includes: symbol mapper 21 that converts bit data, which are a transmitted signal, into symbol data and performs symbol mapping;. S/P converter 22 that converts serial data into parallel data; inverse multi-carrier transformer 23 that performs desired frequency-to-time transform, such as an inverse Fourier transformer (IFFT), an inverse wavelet transformer (IDWT), or the like; and D/A converter 24. In FIG. 18, transmitter 121 performs functions of symbol mapper 21, S/P converter 22, and inverse multi-carrier transformer 23 in PLC PHY block 201c of main IC 201; and a function of D/A converter 24 in D/A converter 234 of AFE IC 202.

As described above, the power supply apparatus according to the present embodiments is capable of supplying power to the power load without attenuating the communication signal even when the signal reduction circuit is not provided. Therefore, the signal reduction circuit can be eliminated, or specification requirements for the signal reduction circuit can be lowered. Thus, simplifying the apparatus configuration and reducing the apparatus size allow easy achievement of the power supply apparatus applicable to a peripheral device that requires high power consumption.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2005-292522 filed on Oct. 5, 2005, entire content of which is expressly incorporated by reference herein.

What is claimed is:

1. A power supply apparatus for outputting a predetermined voltage based on an alternative voltage on which a communication signal is superimposed, the alternative voltage being supplied from a power line and having a first frequency, and the communication signal having a second frequency higher than the first frequency, the power supply apparatus comprising:
a transformer which has a primary winding and a secondary winding, the primary winding transmitting the communication signal to the secondary winding, the communication signal being superimposed on the alternative voltage; and
a capacitor which has impedance characteristics such that impedance at the first frequency is higher than impedance at the second frequency;
wherein the primary winding has a first end and a second end, the first end for being connected to the power line through the capacitor, and the second end for being connected to the power line, and
wherein the alternative voltage is applied both to the primary winding and the capacitor and the power supply apparatus outputs the predetermined voltage through the capacitor based on the alternative voltage being applied to the capacitor.

2. The power supply apparatus according to claim 1, wherein:
the transformer has two primary windings; and
the two primary windings are connected electrically in phase via the capacitor.

3. The power supply apparatus according to claim 2, wherein the transformer has two secondary windings; and
the two primary windings are connected electrically in phase.

4. The power supply apparatus according to claim 1, further comprising:
an outlet to which a plug is capable of being connected, wherein the power supply apparatus outputs, from the outlet, the predetermined voltage through the capacitor.

5. A power line communication apparatus comprising:
the power supply apparatus according to claim 1; and
a modem which modulates and demodulates the communication signal,
wherein the power supply apparatus outputs, to the modem, the predetermined voltage through the capacitor.

6. The power line communication apparatus according to claim 5, further comprising:
a signal reduction circuit which is connected between the power supply apparatus and the modem, the signal reduction circuit having a coil connected to the power supply apparatus.

7. A power supply apparatus for outputting, to a first circuit, a predetermined voltage based on alternative voltage and for outputting, to a second circuit, a communication signal which has a higher frequency than a frequency of said alternative voltage, the communication signal being superimposed on the alternative voltage, the power supply apparatus comprising:
a capacitor receiving said alternative voltage with said communication signal superimposed thereon and having an impedance characteristic which causes the capacitor to present a low impedance to said higher frequency of said communication signal and a high impedance to said frequency of said alternative voltage, wherein said capacitor operates to (i) at least partially prevent output of the alternative voltage to the second circuit and act equivalent to a short circuit to pass the communication signal to the second circuit, and (ii) at least partially prevent output of the communication signal to the first circuit and provide to the first circuit the predetermined voltage developed across the capacitor based on the alternative voltage.

8. The power supply apparatus according to claim 7, wherein the second circuit is a modem which modulates and demodulates the communication signal.

9. The power supply apparatus according to claim 7, wherein the first circuit is a regulator which generates direct voltage based on the predetermined voltage.

10. The power supply apparatus according to claim 1, wherein the power supply apparatus outputs the predetermined voltage from both ends of the capacitor.

11. The power supply apparatus according to claim 7, wherein to capacitor outputs the predetermined voltage from both ends of the capacitor.

* * * * *